(No Model.) 2 Sheets—Sheet 1.

A. E. KEITH & J. & C. J. ERICKSON.
CALLING DEVICE FOR TELEPHONE EXCHANGES.

No. 597,062. Patented Jan. 11, 1898.

WITNESSES:
H. S. Brown.
H. H. Hale.

INVENTORS:
Alexander E. Keith.
John Erickson.
Charles J. Erickson.
By their atty. Oscar Snell.

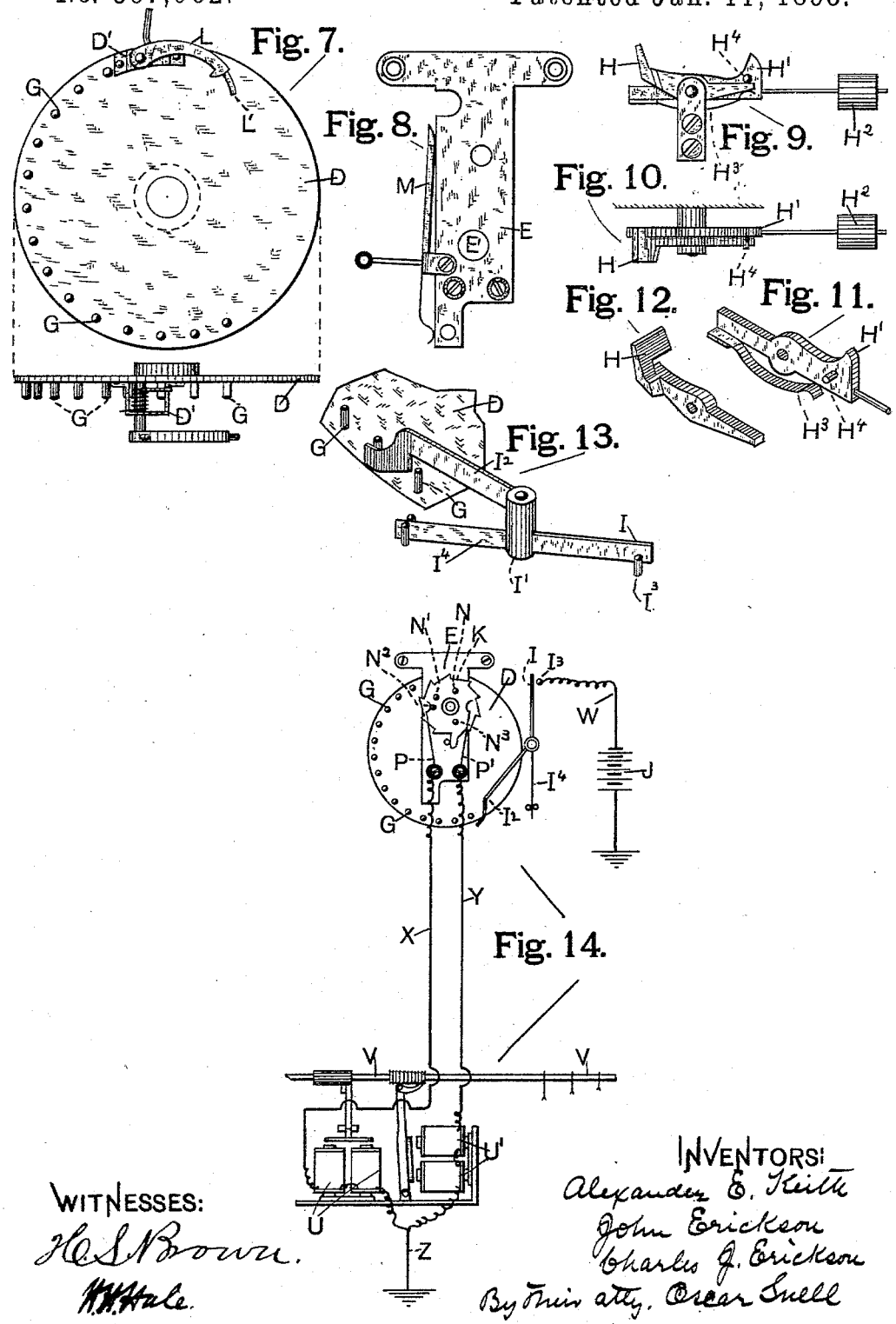

UNITED STATES PATENT OFFICE.

ALEXANDER E. KEITH, JOHN ERICKSON, AND CHARLES J. ERICKSON, OF CHICAGO, ILLINOIS, ASSIGNORS TO THE STROWGER AUTOMATIC TELEPHONE EXCHANGE, OF ILLINOIS.

CALLING DEVICE FOR TELEPHONE-EXCHANGES.

SPECIFICATION forming part of Letters Patent No. 597,062, dated January 11, 1898.

Application filed August 20, 1896. Serial No. 603,320. (No model.)

*To all whom it may concern:*

Be it known that we, ALEXANDER E. KEITH, JOHN ERICKSON, and CHARLES J. ERICKSON, citizens of the United States, residing at Chicago, in the county of Cook and State of Illinois, have invented a new and useful Automatic Calling Device for Telephone-Exchanges, of which the following is a specification.

Our invention relates to means for transmitting electrical impulses over a plurality of lines by means of a step-by-step circuit-breaker and a circuit-changer and which may be employed in combination with automatic telephone-exchange systems, whereby a person at one station may intermittently energize a plurality of electromagnets, one at a time, alternately or in some other desired order at some distant station; and our object is to provide a construction for this purpose which consists of a series of movable finger-holds of which some one is moved up to a stop and then released, there being an indicator connected therewith to show which one of a plurality of electromagnets is in connection with the line-wires. The finger-holds are disposed in this instance in circular order concentric with a shaft, which latter is adapted to revolve by the action of a finger engaged with some one of the holds and operating against the resiliency of a spring, which latter is wound up a different amount for the movement of each finger-hold, and when any particular finger-hold has been moved up to a stop and then released the tension of the spring causes the parts to return to the normal position, limited by an escapement mechanism to a moderate rate of speed, and causes a switch in this return movement to serve as a medium through which an intermittent current of electricity is transmitted through a particular one of a plurality of wires, each connected to a motor-magnet to be energized, as may be desired, and as is described hereinafter and illustrated in the accompanying drawings, in which—

Figure 1:
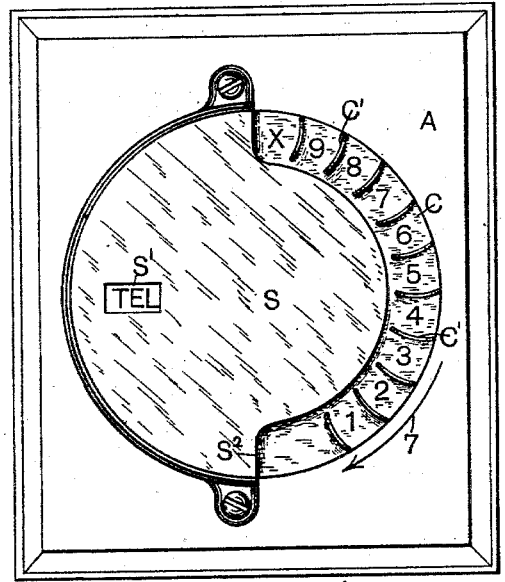
Figure 2:
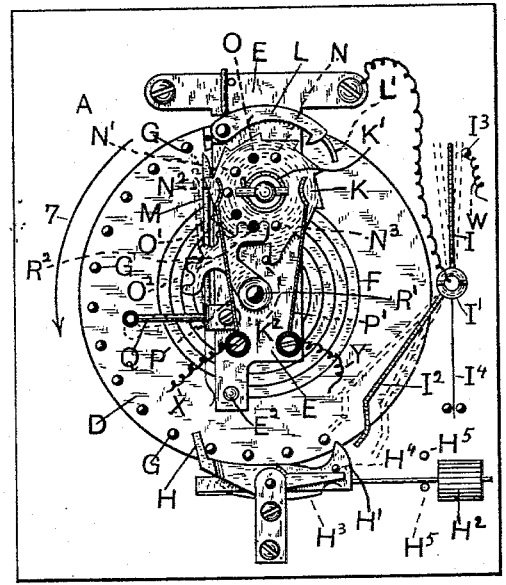
Figure 3:
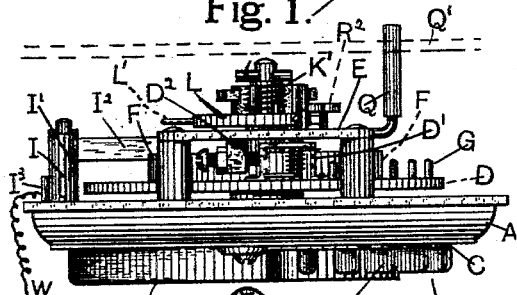
Figure 5:
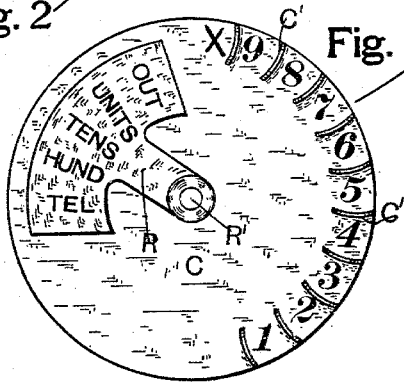
Figure 4:
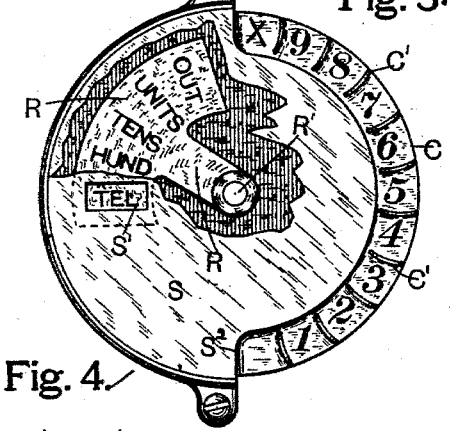
Figure 6:
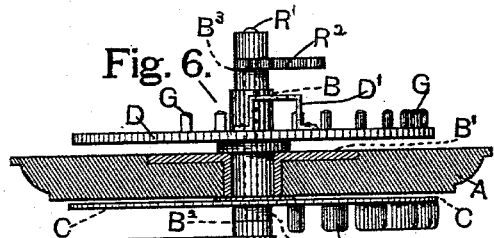

Figure 1 is a front elevation showing the parts which are ordinarily visible when applied to an automatic telephone-exchange system. Fig. 2 is an inside or rear elevation showing the greater part of the switching apparatus. Fig. 3 is a plan showing the operative parts in the same relative position as indicated in Figs. 1 and 2. Fig. 4 is an elevation of the front case with a portion broken away to show method of applying indicator for designating the particular magnet being energized. Fig. 5 is a front elevation showing the finger-hold plate and magnet-indicator as they appear when the front case is removed. Fig. 6 is a plan of the hollow actuating-shaft, the pivoted support therefor, which is part of the frame of the device, being broken away; but the finger-hold plate and the escapement-wheel, which are attached to the actuating-shaft, and the magnet-indicator and the segment of cogs for operating the magnet-indicator are all shown in elevation, the shaft connecting the magnet-indicator and segment of cogs for operating the same being shown in broken lines concentric with the actuating-shaft, through which it is disposed and in which it partially rotates. Fig. 7 shows, respectively, a rear elevation and a plan of the combined escapement and switch-actuating wheel, which when in the operative position is firmly attached to the inside end of the actuating-shaft. Fig. 7 also shows an actuating-pawl pivotally mounted in a bracket, which latter is secured upon the escapement-wheel. Fig. 8 is a rear elevation of the frame in which the rear end of the actuating-shaft is pivotally mounted and to the side of which is pivotally mounted a detent, which is hereinafter referred to. Figs. 9 and 10 are respectively an elevation and a plan of the pallets of an escapement device, which are also shown in Fig. 2 in engagement with a series of pins near the periphery of the escapement-wheel. Figs. 11 and 12 are detached perspective views of the pallets shown in the escapement device, Figs. 9 and 10. Fig. 13 is the operative mechanism of a make-and-break switch, which operates to transmit a current in only one direction of the movement of the pins of the escapement-wheel.

Fig. 14 is a diagrammatic view showing the connection between the calling device and the magnets of an automatic telephone-exchange, together with the usual battery and ground connections.

Similar letters indicate like parts throughout the several views.

In Figs. 1 and 2 the mechanism is shown mounted on a door A, which may form the cover or front of a shallow box to contain the mechanism shown in Fig. 2 when the door is closed.

As shown in Fig. 6, the hollow shaft B is mounted to revolve in a metallic bearing B', which forms a bushing disposed centrally through the box-lid A, the hollow shaft terminating at the front end at $B^2$ and at the inside end at $B^3$.

At the front end of shaft B is firmly secured the disk C, around one side of which, near the margin, are disposed ten projections or finger-holds, such as C', and beginning at the bottom each finger-hold is designated by a different numeral from "1" to "X," inclusive, in arithmetical order.

Close to door A, near the inside face thereof, is securely mounted on shaft B a wheel D, Fig. 7, and the outer end of shaft B projects through a hole E' in frame E, Fig. 8.

Between frame E and wheel D is a volute spring F, which is attached at one end to a pin at $E^2$, near the lower end of frame E, the spring being partially wound up to hold wheel D and the finger-hold disk C in the normal position shown, with the stop-bracket D' of wheel D against an adjustable stop-screw $D^2$ in a lug attached to frame E, Figs. 3 and 7.

Wheel D is provided with a series of pins G, disposed at equal distances apart, near the peripheral edge thereof, which serve a double purpose, first, by engaging with the pallets H and H' in one direction of their movement, which is limited thereby, and for operating a switch I against a pin $I^3$, which is connected with battery J. The pallets and the switch form the main part of what we shall call a "step-by-step" circuit-breaker.

The pallets H and H' are both pivotally mounted upon the same pin, and pallet H' is provided with an arm, to which a weight $H^2$ is attached, and with a spring $H^3$, which holds a prolongation of pallet H against a pin $H^4$, so that in action when the pin-wheel D is turned in the direction indicated by arrow 7 the pins G will press the end of pallet H downwardly and the prolongation up from pin $H^4$ of pallet H' and bend spring $H^3$ downwardly without disturbing the other pallet or its weight $H^2$; but when wheel D is turned in the direction contrary to that indicated by arrow 7 pins G will contact the inside face of pallet H and force it downwardly and cause the prolongation thereof to contact pin $H^4$ and vibrate pallet H', together with the weight $H^2$, upwardly, when pallet H' is contacted successively by pins G, which are successively retarded in their movement by the rapidity of the vibrations of the pallets, which vibrations may be easily changed in speed by shifting the weight $H^2$ on the arm of pallet H'. The amplitude of the vibration of the pallets is limited by pins $H^5$, which are contacted by the weight-arm of pallet H' at the limits of movement.

The switch-arm I is attached to a boss I', which is pivotally mounted on a pin and is electrically connected with frame E. Attached also to boss I' is an arm $I^2$, whose free end is shaped, as shown in Fig. 13, so that the pins G will vibrate it in a direction to cause switch-arm I to move from pin $I^3$, which latter is connected with battery J, Fig. 14, when wheel D is turned in the direction indicated by arrow 7, but switch-arm I will vibrate and make and break contact with pin $I^3$ once for each pin G, which contacts arm $I^2$, when wheel D moves in the opposite direction, (indicated by arrow 7,) the resiliency of spring $I^4$, with its outer end between two pins and its inner end attached to boss I, serving to normally hold the switch-arm I out of contact with pin $I^3$ and the free end of arm $I^2$ midway between the limit of its vibrations.

Mounted on a pin attached to frame E and in electrical connection therewith is ratchet-wheel K, which has a helical spring K' attached at one end to the boss thereof and the other end to the pivotal pin, and the ratchet-wheel is limited in its motion when actuated by the spring to the normal position by a projection therefrom contacting a pin $K^2$, Fig. 2. At L is pivotally mounted upon wheel D in stop-bracket D' a pawl whose free end is adapted to engage the teeth of ratchet-wheel K. At L' is a forward projection from pawl L, which contacts the teeth of the wheel and lifts the hook of the pawl out of engagement with each ratchet-tooth after it has moved the wheel more than the pitch of one tooth. A detent M, Figs. 2 and 8, serves to hold the ratchet-wheel in the operated position. Attached to the face of ratchet-wheel K are seven pins which serve as cog-teeth and four of them contact-points for spring-switches P and P'. Said wheel, pins, and switches form what we shall call the "circuit-changer." Pins N, N', $N^2$, and $N^3$ are of metal and in electrical connection with the frame E through ratchet-wheel K and its pivotal pin, but pins O, O', and $O^2$ are of insulating material or are too short to contact with spring-switches P and P'. Spring-switches P and P' are insulatingly attached to frame E. At Q is a bent arm projecting from detent M, which is in line with the detent of the telephone-hook lever, (indicated by broken lines Q', Fig. 3,) which action releases detent M, when ratchet-wheel K, if it has been moved forwardly, is free to turn back by virtue of spring K' to the normal position.

The means for indicating what call has been made and whether the telephone-exchange is in the normal condition consists in this instance of the segment-plate R, which is marked with the abreviations and words "Tel.," "Hund.," "Tens," "Units," and "Out," and is securely fastened to the front end of shaft R', which is disposed through the axial portion of shaft B and has attached to the inside end a segment of cogs R², which are engaged by the pins N, O, N', N², O', O², and N³ of ratchet-wheel K.

The entire front of the finger-hold disk C is covered by a case S with the exception of the right-hand side, where are exposed the finger-holds C', and at S', where there is an opening through which the abbreviations and words "Tel.," "Hund.," &c., may be seen, successively, as they are brought into register therewith. The case S projects outwardly sufficient to permit the finger-holds C' to pass in under the front plate of the casing and in under the segment-plate R in rotating the finger-hold disk, the casing serving as a stop for the finger at the shoulder S², Figs. 1 and 4.

To illustrate the application and operation of this calling device in an automatic telephone-exchange system, where each exchange-machine is provided with a plurality of electromagnets and each of said magnets is adapted to perform a separate function, we will refer to Fig. 14, which is a diagrammatic view of the calling device in electrical connection with an automatic telephone-exchange at a central station, which exchange is represented by one electromagnet U, adapted to rotate the switch-shaft V, and another electromagnet U', adapted to slide switch-shaft V longitudinally in the operation of switching, as is done in the electrical exchange embodied in Letters Patent of the United States, No. 540,168, granted May 28, 1895, to Alexander E. Keith, Frank Lundquist, John Erickson, and Charles J. Erickson.

In operating this device when connected with an automatic exchange having a plurality of magnets on the decimal system, for instance, it is desired to set the exchange-machine to communicate with telephone-exchange machine and telephone No. 456, the operator inserts a finger in contact with finger-hold No. 4, which is pulled down around in the direction indicated by arrow 7, Fig. 1, until the finger contacts the shoulder of the case S at S², when the finger is withdrawn, which releases the finger-hold disk C and the connected wheel D, when spring F will return the parts to the normal position, but in the meantime the pawl L at the beginning of the motion of wheel D, being in engagement with ratchet-wheel K, has turned this wheel equal to more than the pitch of one tooth, when detent M drops into engagement behind one of the teeth and holds the wheel in the partially-turned position after the pawl L is forced to slip off of the engaged tooth by the action of the projection L' thereof, as described, which partial movement of ratchet-wheel K moves contact-pin N' around in touch with spring-switch P and causes segment of cogs R to turn an amount equal to the pitch of one tooth, which removes the abbreviation "Tel." from the opening S and moves into its place the abbreviation "Hund." During the time the operative parts are being returned to the normal position the switch-arm I is made to contact pin I³ four times, because there are four pins G on wheel D adapted to strike arm I² in this return movement, when current is transmitted four separate times from battery J through wire W, switch I, thence to contact-pin N', spring-switch P and line-wire X, and magnet U to ground, thus energizing this magnet four times. Next, a finger is inserted in contact with finger-hold No. 5, which is turned around to the stop-shoulder S² and released when pawl L will have turned ratchet-wheel K one tooth more, which will bring contact-pin N³ into contact with spring-switch P' and contact-pin N' out of contact with spring-switch P and turns segment R² one tooth, which moves the abbreviation "Hund." from opening S and into its place the word "Tens," and during the time the parts are returning to the normal position switch-arm I is made to contact pin I³ five times by the action of five pins G, which register with the five finger-holds C' from the beginning, when current is transmitted five separate times from battery J through wire W, pin I³, switch I, thence through frame E to the contact-pin N³, spring-switch P', wire Y, and magnet U' to ground, thus energizing magnet U' five times. Next a finger is inserted in contact with finger-hold No. 6, which is pulled around to stop shoulder S² and released, when in the same manner as before described ratchet-wheel K is moved around one tooth, which engages contact-pin N with spring-switch P and disengages spring-switch P from contact-pin N³, and segment-cog R² is turned one tooth, which changes the word "Tens" at opening S' to "Units," and in the return of the operative parts to the normal position switch-arm I is made to contact pin I³ six times, when current is transmitted six separate times from battery J through wire W, switch I, thence to pin N, spring-switch P, wire X, and magnet U to ground, thus again energizing this magnet, but six times, instead of four times, as in the first instance. When by the action of pawl L the ratchet-wheel K has been turned around to the hundred-point, any additional manipulation of the finger-hold disk causes the pawl to turn ratchet-wheel K the pitch of one more tooth, when "Out" will be substituted for "Units" at opening S', which is to indicate that the telephone has been entirely disconnected electrically and must be released in order to again be operative, which release is accomplished by hanging up the telephone-receiver on the hook of the usual telephone-lever, (shown in broken lines Q', Fig. 3,) which lever in descending contacts bent arm Q, projecting from detent M, which latter is released from ratchet-wheel K, which, being free, is revolved backwardly by spring F to the normal position with the stop projection thereof in contact with pin K², Fig. 2, and with the finger-holds in the normal position shown in Fig. 1, from which position the parts may again be operated as hereinbefore described. When ratchet-wheel K is turned around to the position when the word "Out" shows at opening S', the stop projection thereon is in such a position that it is struck by projection L' at each additional thrust of the attached pawl L, which latter is lifted by this action and prevented from further operating the ratchet-wheel should the finger-hold disk be additionally manipulated by a careless operator.

We claim as our invention—

1. A transmitter for sending electric impulses over a plurality of lines comprising a step-by-step circuit-breaker to send a series of impulses, a circuit-changer for directing the currents over a selected line, and a connection between the circuit-breaker and the circuit-changer constructed to actuate the circuit-changer each time that the circuit-breaker is operated through its course, substantially as set forth.

2. The combination of a movable device having a series of adjacent finger-holds, a circuit-breaker actuated on movement of the device to send a number of impulses corresponding to the selected holds, and a single stop arranged to contact with the finger in the finger-holds and limit the movement thereof, substantially as set forth.

3. The combination, with a circuit-breaker, of a circuit-changer for directing the current over different lines, a series of finger-holds, and means for automatically operating the changer each time the finger-holds are operated, substantially as set forth.

4. The combination, with a circuit-breaker, of a circuit-changer for directing the current over different lines, a series of finger-holds, and a stop for automatically limiting the number of times that the changer may be operated, substantially as set forth.

5. The combination, with a circuit-breaker, of a circuit-changer for directing the current over different lines, an indicator, a series of consecutively-arranged finger-holds, and means for operating the circuit-breaker, the circuit-changer, and the indicator at every operation of the finger-holds, substantially as set forth.

6. The combination, with a circuit-changer for directing the current over different lines, of a circuit-breaker, a series of finger-holds, and means for operating the changer once for each operation of the finger-holds and means for varying the number of times the circuit-breaker is operated, substantially as set forth.

7. The combination, with a circuit-changer for directing the current over different lines, of a circuit-breaker, a wheel common to both and provided with means for operating the changer but once, and the breaker a variable number of times each time the wheel is rotated, and means for operating the wheel, substantially as set forth.

8. The combination, with a circuit-changer for directing the current over different lines, of a circuit-breaker, a wheel common to both and provided with means for operating the changer when rotated in one direction and the breaker when rotated in the opposite direction, and means for operating the wheel, substantially as set forth.

9. In a calling device, the combination, with a disk, the periphery of which is provided with a series of finger-holds, a stop adjacent thereto, of a make-and-break device, two wheels, one of which is provided with means for operating the other one and also for operating the make-and-break device, substantially as set forth.

10. In a calling device, the combination, with a series of finger-holds, of a wheel provided with pins, a portion of said pins being electric conductors, a make-and-break device, a retarding device, said pins being adapted to simultaneously operate the retarding device and the make and break, substantially as set forth.

11. In a calling device, the combination, with a series of finger-holds, of a ratchet-wheel and a pin-wheel, a pawl on the pin-wheel adapted to engage with the ratchet-wheel, of a make-and-break device, and two electromagnets, either one of which is adapted to be placed in circuit by the rotation of the ratchet-wheel, substantially as set forth.

12. In a calling device, the combination, with a series of finger-holds, of a ratchet-wheel provided with pins, contact-points adapted to be engaged by said pins, a make-and-break device, and means for rotating the ratchet-wheel by the movement of the finger-holds, substantially as set forth.

13. In a calling device, the combination, with a series of finger-holds, of a spring-actuated wheel connected therewith, a ratchet-wheel adapted to be moved one step for each operation of the finger-holds, a detent for holding said ratchet-wheel, a make-and-break device, and means for automatically releasing the ratchet-wheel by hanging up the transmitter of the telephone, substantially as set forth.

14. In a calling device, the combination, with a series of finger-holds, of a pin-wheel connected therewith, a make-and-break device, and two pallets, one of which is disconnected from the other when the pins are moving in one direction but caused to engage therewith when moved by said wheel in the opposite direction, substantially as set forth.

15. In a calling device, the combination, with a case, of a disk journaled therein, a portion of the periphery of which is provided with finger-holds, an indicator connected with the disk, the top of the casing being cut away at one side to form a stop, and at another point to expose a portion of the indicator, and a make-and-break device, substantially as set forth.

In testimony that we claim the foregoing we have hereunto set our hands, this 11th day of July, 1896, in the presence of witnesses.

ALEXANDER E. KEITH.
JOHN ERICKSON.
CHARLES J. ERICKSON.

Witnesses:
JOSEPH HARRIS,
WM. W. THOMPSON.